(12) United States Patent
Peden

(10) Patent No.: US 8,474,232 B2
(45) Date of Patent: Jul. 2, 2013

(54) WIDE SWEEP RAKE, WINDROW DIVERTER AND BALING APPARATUS INCORPORATING SAME

(76) Inventor: Bruce Peden, Glasgow, KY (US)

(*) Notice: Subject to any disclaimer, the term of this patent is extended or adjusted under 35 U.S.C. 154(b) by 0 days.

(21) Appl. No.: 12/590,093

(22) Filed: Nov. 2, 2009

(65) Prior Publication Data

US 2010/0146924 A1    Jun. 17, 2010

Related U.S. Application Data

(60) Provisional application No. 61/197,984, filed on Oct. 31, 2008.

(51) Int. Cl.
*A01D 78/00* (2006.01)
*A01D 43/02* (2006.01)

(52) U.S. Cl.
USPC ............................................. 56/377; 56/341

(58) Field of Classification Search
USPC ........................... 56/341, 364, 375, 378, 377
See application file for complete search history.

(56) References Cited

U.S. PATENT DOCUMENTS

| | | |
|---|---|---|
| 1,877,770 A | 9/1932 | Larson |
| 2,731,782 A | 1/1956 | Mason |
| 2,756,557 A | 7/1956 | Bornzin et al. |
| 2,783,606 A | 3/1957 | Wilson |
| 3,125,845 A | 3/1964 | Lee |
| 3,678,669 A * | 7/1972 | Czajkowski .................... 56/314 |
| 4,077,189 A | 3/1978 | Hering |
| 4,182,103 A * | 1/1980 | McNutt .......................... 56/364 |
| 4,214,428 A | 7/1980 | Caraway |
| 4,446,685 A * | 5/1984 | Coeffic ........................... 56/377 |
| 5,127,217 A | 7/1992 | Fell et al. |
| 5,400,578 A | 3/1995 | Galanti |
| 5,404,702 A | 4/1995 | Lewis |
| 5,598,691 A * | 2/1997 | Peeters ........................... 56/377 |
| 5,987,864 A * | 11/1999 | Lutz ................................ 56/377 |
| 6,105,354 A | 8/2000 | Luhn et al. |
| 6,543,212 B2 * | 4/2003 | Tonutti ........................... 56/375 |
| 7,043,892 B1 * | 5/2006 | Kessler .......................... 56/341 |
| 2002/0059790 A1 * | 5/2002 | Paulsen ......................... 56/377 |
| 2005/0172602 A1 | 8/2005 | Scott |

FOREIGN PATENT DOCUMENTS

WO    WO 94/10828    5/1994

* cited by examiner

*Primary Examiner* — Alicia Torres
(74) *Attorney, Agent, or Firm* — Carrithers Law Office PLLC

(57) ABSTRACT

A combination rake and hay baling apparatus including a baler, a hay rake with extendable sweep arms and a plurality of rakes having tines attached to the sweep arms mounted to a tow bar pulling the baler, and a windrow diverter mounted to the tow bar behind the rake and in front of a hay pick-up of the baler, all of which is pulled and powered simultaneously by a single tractor.

18 Claims, 10 Drawing Sheets

WIDE SWEEP RAKE, WINDROW DIVERTER AND BALING APPARATUS INCORPORATING SAME

CROSS REFERENCES TO RELATED APPLICATIONS

This application claims priority from U.S. Provisional Application Ser. No. 61/197,984 filed on Oct. 31, 2008.

FIELD OF INVENTION

This invention relates generally to baling material such as hay or the like where the cut material is raked into a windrow that is picked and baled by a baler and more particularly a circular basket like raking reel, to a windrow diverter apparatus incorporating such reel, a rake with a windrow diverter, to baling apparatus including a baler with a rake and a windrow diverter associated therewith for selectively diverting portions of the windrow laterally, relative to the direction of travel of the baler, during baling and to a rake having an articulated sweep arm providing a wide sweep rake.

Raking and baling functions are performed in a single pass in which the cut material, for example hay, is raked into a windrow that is controllably reduced in width suitable for being picked up and formed into a bale by the baler as a tractor towing the same travels over a mowed field of the hay. The windrow diverting mechanism can divert at least one or the other or both of the marginal edge portions of the windrow reducing it to a width that is no greater than that of the baler pick-up. The width of the windrow can be controllably narrowed by the operator so as to be narrower than the baler pickup and divert that narrower windrow to positions across the width of the bale where and when needed to form a suitable bale.

BACKGROUND OF INVENTION

Attempts at introducing economies into baling material such as hay or the like has resulted in various proposals for combining the raking function and baling function into a single operation. In some instances the rake is mounted on the tractor that tows the baler and by way of example of the same reference maybe had to the following:

U.S. Pat. No. 4,214,428 Granted Jul. 29, 1980 Inventor Robert O Caraway entitled "Raking and Baling Machine"

U.S. Pat. No. 4,077,189 Granted Mar. 7, 1978 Inventor Walton C. Hering entitled "Front Mounted Adjustable Twin Rakes"

In other instances the rake is located between the tractor and the baler and by of example of the same reference maybe had to the following:

U.S. Pat. No. 6,105,354 Granted Aug. 22, 2000 Inventor Harold R Luhn et at entitled "Rake apparatus"

U.S. Pat. No. 5,404,702 Granted Apr. 11, 1995 Inventor Johnny M Lewis entitled "Retrofitable Wide Windrow Apparatus".

In these references an elongate draw bar connects the tractor to the baler and a rake is mounted on the draw bar.

Where the raking and baling are two separate operations the operator, during the baling operation, is able to drive along a zig-zag path to distribute the windrow to where needed across the width of the bale to provide, or caused to be formed, a suitable bale. In this operation the windrow is normally narrower in width than the width of the baler pick-up. Driving a zig-zag path virtually little or no affect in a single raking and baling operation in which the windrow discharges from the rake at a position in proximity to the baler intake.

It is known to have side delivery rake means at the infeed end of a pick-up and operative to sweep cut material beyond the width of the pick-up into a path in alignment with the pick-up and by way of example of same reference maybe had to the following:

U.S. patents

U.S. Pat. No. 5,400,578 Granted Mar. 28, 1995 Inventor Marcello B. Galanti entitled "Apparatus for Raking and Baling Cut Material"

U.S. Pat. No. 5,127,217 Granted Jul. 7, 1992 Inventor Ferol S Fell et al entitled "Round Baler Having Wide Windrow Converging Mechanism"

U.S. Pat. No. 3,125,845 Granted Mar. 24, 1964 Inventor M. A. Lee entitled "Swath Gathering Mechanism"

U.S. Pat. No. 2,783,606 Granted Mar. 5, 1957 Inventor E. I. Wilson entitled "Windrow Divider and Bale Pickup Extension"

U.S. Pat. No. 2,756,557 Granted Jul. 31, 1956 Inventor J. H. Bornzin et al entitled "Pick-up Device with Driven Sweeping Rakes"

PCT International Application publication No WO 94/10828 Published May 25, 1994 entitled "An Improved Round Baler" Inventor Brian Taeg These references disclose converging rake mechanisms that extend laterally beyond the pick-up of the baler and move the material within the swept area into a windrow corresponding to the width of the baler pickup. The rake mechanisms are allowed to move up and down to overcome obstacles and the like but not laterally relative to the path of travel except for U.S. Pat. No. 2,756,557 and the PCT publication. In the '557 patent the lateral movement changes only the width of sweep. The PCT published application discloses a rake having raking reels that are power driven and mounted on arms attached to a draw bar by a telescopic connection capable of being moved in a direction toward and away from the path of travel. The PCT disclosed apparatus is simply a raking and baling operation.

None of the forgoing references disclose means to rake material into a windrow followed by apparatus to shift at least one marginal edge portion of such windrow to reduce the width of the windrow. The forging references fail to disclose or even remotely suggest apparatus for reducing the width of the windrow during baling to be less than that of the baler pick-up and divert that narrower windrow to various positions as maybe desired in a direction laterally across the width of the bale being formed.

Rakes with tined raking wheels in rolling engagement with the ground are known and by way of example reference maybe had to the aforementioned U.S. Pat. No. 4,214,428. The tined wheels perform a raking function by being rotated through frictional engagement with the ground. The tined wheels rotate in vertical planes appropriately angled relative to the direction of travel such that the plurality of tine wheels in series move the material into a windrow.

The aforementioned U.S. Pat. No. 5,400,578 discloses rake members that are power driven and rotate in horizontal planes. The aforementioned PCT published application discloses tined wheels that are power driven and is silent on the orientation of the same.

SUMMARY OF INVENTION

An object of the present invention is to provide apparatus that is used in association with a baling operation to divert the windrow laterally relative to the width of the baling area of the baler so to facilitate forming a suitable bale during baling.

A further object of the present invention is to provide a windrow diverter that is located forwardly of the baler pickup and controllably operative to narrow the windrow to a width that is narrower than the width of the baler pick-up.

A further principal object of the present invention is to provide a windrow diverter that is controllably operative to direct the same toward one or the other end of the bale being formed.

A further object of the present invention is to provide a rake and windrow narrowing apparatus for use in association with a baler.

A further object of the present invention is to provide an elongate draw bar for use in connecting a tow vehicle to a baler and wherein a wide sweep rake and windrow narrowing apparatus are mounted on the tow bar.

A further object of the present invention is to provide a generally circular basket like tined reel raking reel that performs a raking function by rolling engagement and rotating in a plane disposed at an acute angle to the ground.

A further object of the present invention is to provide a tined wheel type rake in which the tine wheels are mounted on articulate sweep arms and thereby providing a wide sweep rake.

A further object of the present invention is to provide a circular basket like tined unit for use in raking cut material lying on the ground.

In keeping with the forgoing there is provided in accordance with one aspect of the present invention an improvement in a crop baling operation in which the cut material on the ground is picked up at an in-feed end of the baler and formed into a bale by the baler as it moves forwardly such improvement comprising incorporating apparatus proximate the in-feed to the baler to controllably laterally shift at least at least marginal edge portions of the windrow relative to the path of travel of the baler, said apparatus including first and second side delivery raking means located respectively on opposites sides of the windrow, means movably mounting said raking means for movement relative to said baler in directions toward and away from the path of travel and means for selectively controlling movement of said raking means.

In accordance with a further aspect of the present invention there is provided a basket type tined raking reel for rotation in a plane disposed at preselected acute angle to the ground surface, said raking reel being a generally basket like circular unit having a central hub, an annular circular rim circumscribing said hub and disposed in selected spaced relation with respect thereto, a plurality of spokes anchored to said hub and having a first portion extending outwardly to said rim, means retaining said spokes in selected spaced relation with respect to one another circumferentially around said rim and at least selected ones of said spokes having a second portion extending beyond said rim, said second spoke portion being disposed at a selected angle to said first portion.

In accordance with a further aspect of the present invention there is provided a rake having at least one sweep arm swingably mounted on a draw bar, each such sweep arm comprising first and second hingedly interconnect rigid arm members, a plurality of tined raking wheels journalled for rotation on each of said first and second members and power means interconnecting said first and second members for moving the same from one position to another of where in a first rake operative position the first and second rigid members are disposed in alignment end to end and a second position wherein they are folded one upon the other in a travel ready inoperative position.

LIST OF DRAWINGS

The invention is illustrated, by way of example, in the accompanying drawings wherein.

Figure 8:
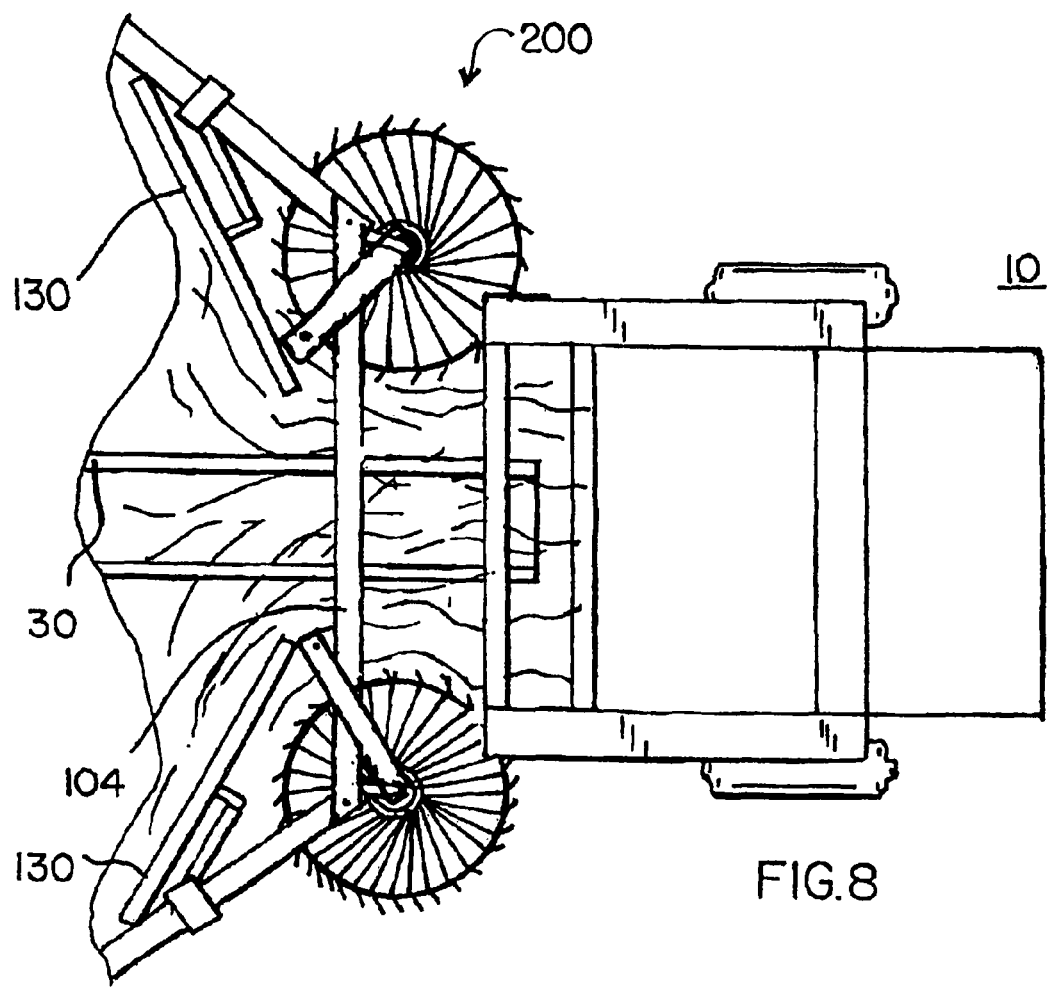
Figure 9:
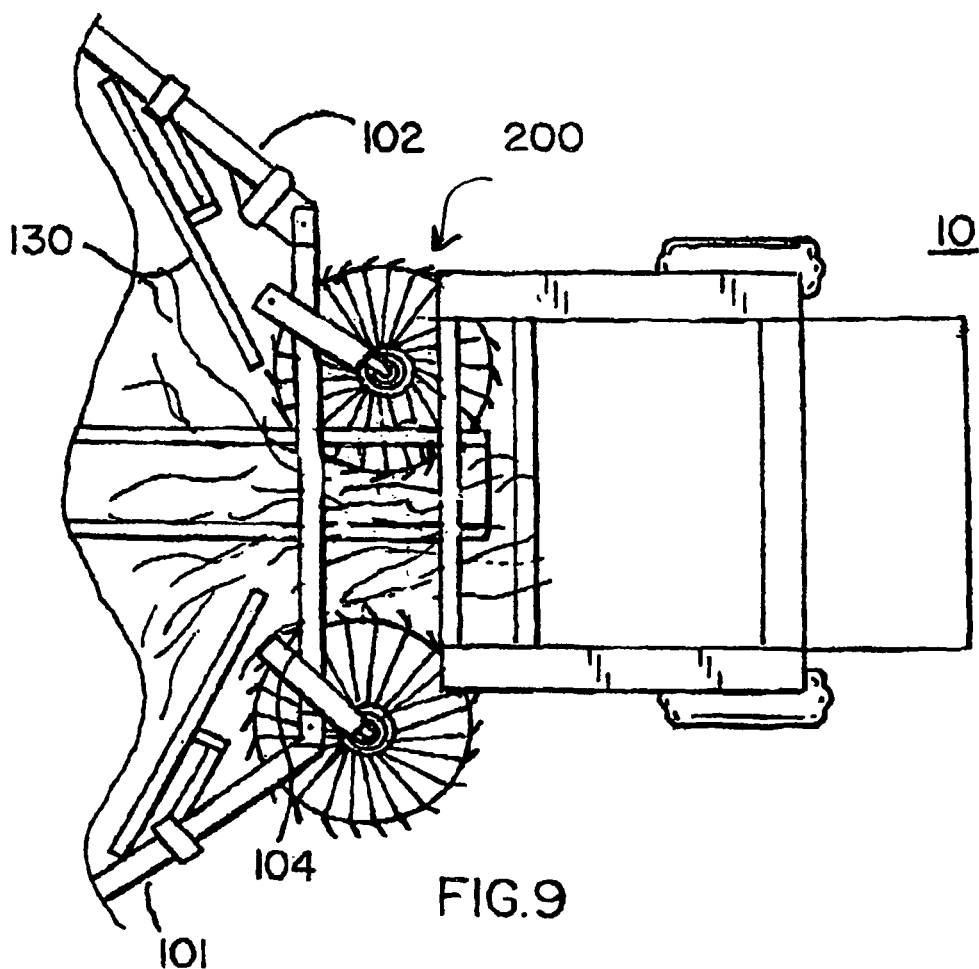
Figure 10:
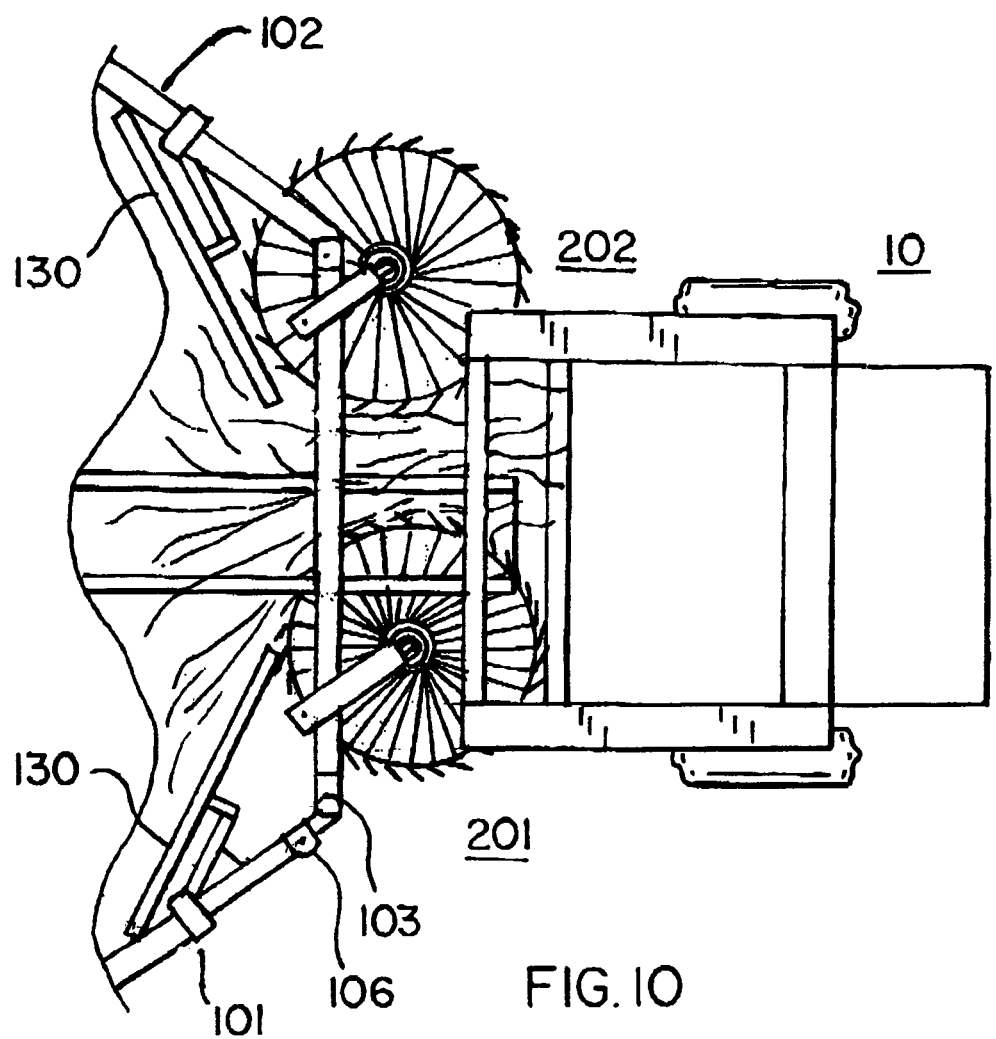
Figure 11:
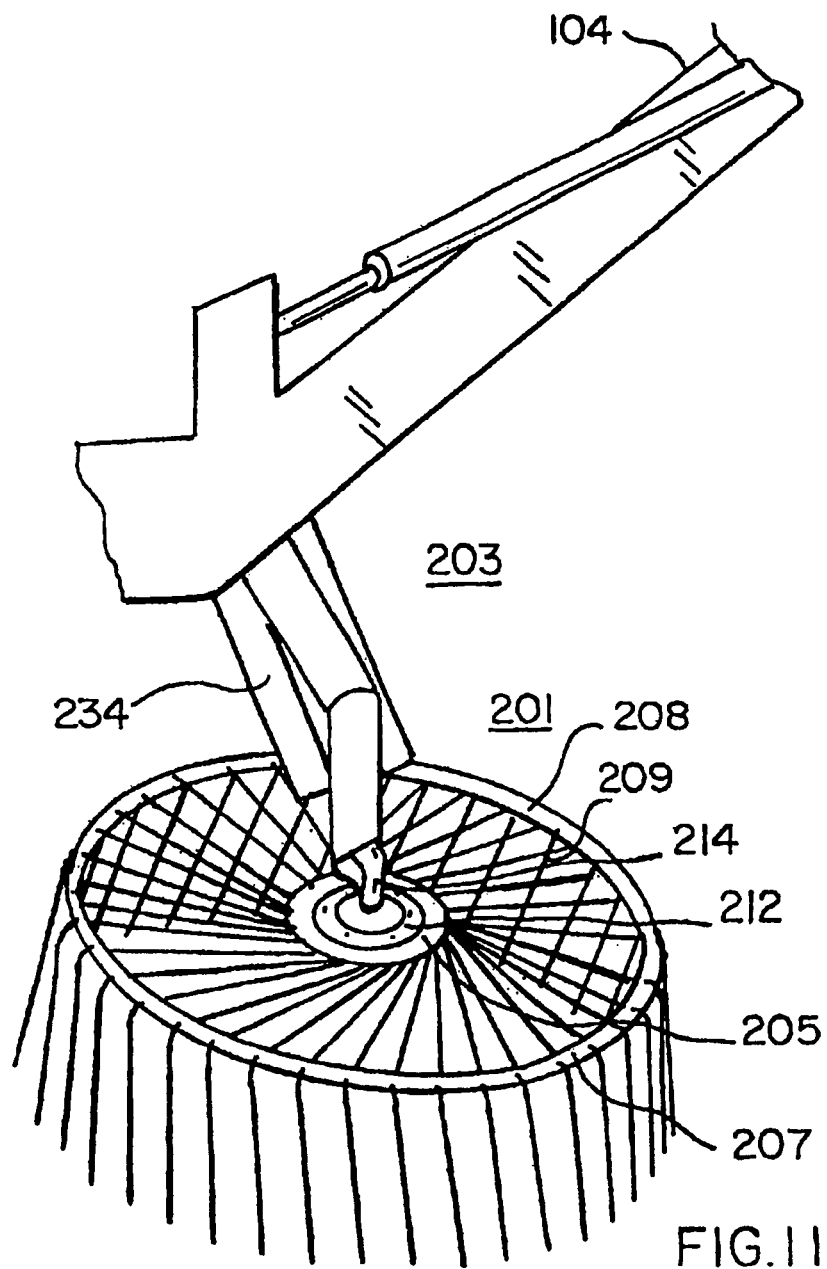
Figure 12:
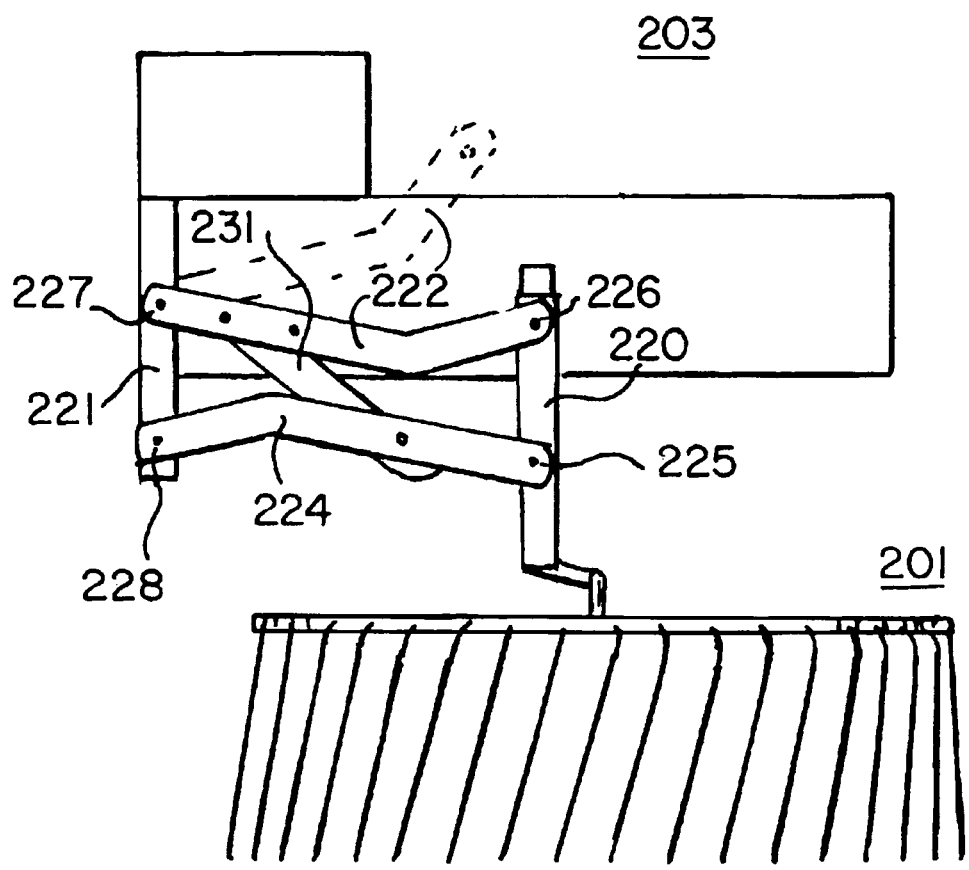
Figure 13:
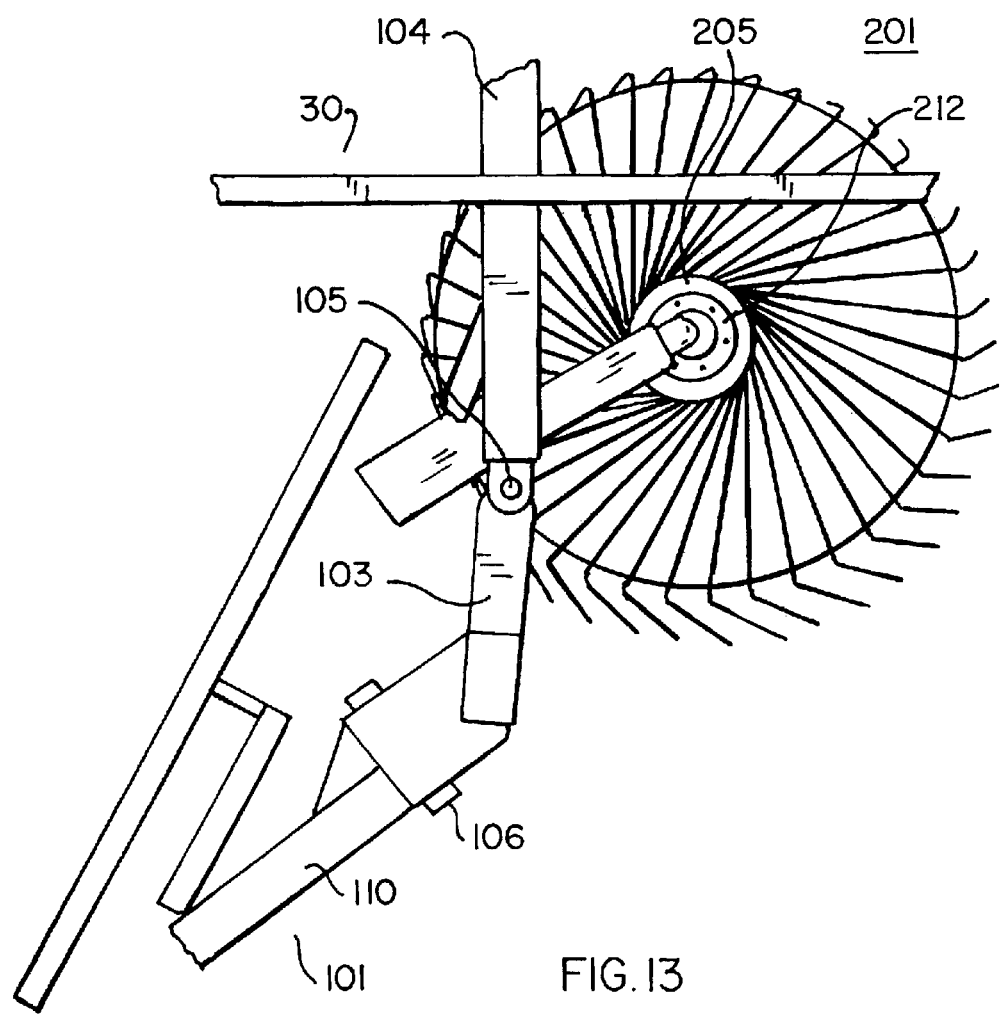
Figure 14:
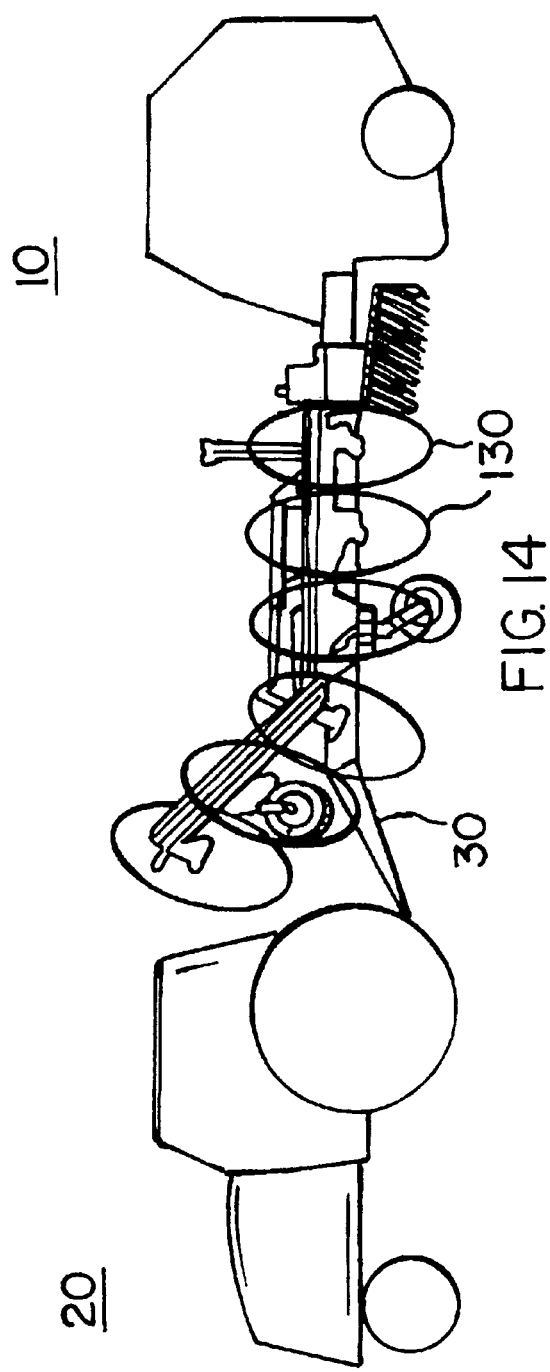

FIGS. 8, 9 and 10 are similar top plan views showing three different positions of the windrow diverting mechanism in which FIG. 8 illustrates diverting each of the marginal edge portions of the windrow so that the width of the windrow corresponds essentially to the width of baler pick-up and FIGS. 9 and 10 illustrate shifting one marginal edge or the other marginal edge of the windrow so that the width thereof is less than the width of the bale being formed and with material being picked up in one instance being diverted in a direction toward one edge of the bale and in the other instance toward the other edge of the bale;

FIG. 11 is an oblique view, on a somewhat larger scale, of one of the pair of windrow lateral diverting mechanisms; and FIGS. 12 and 13 are respectively a side elevational view and a top plan view of the diverter mechanism shown in FIG. 11; and FIG. 14 shows a side view of a tractor towing a roll type baler with a rake and windrow diverting mechanism mounted on the drawbar there between.

DETAILED DESCRIPTION OF PREFERRED EMBODIMENT

Figure 1:
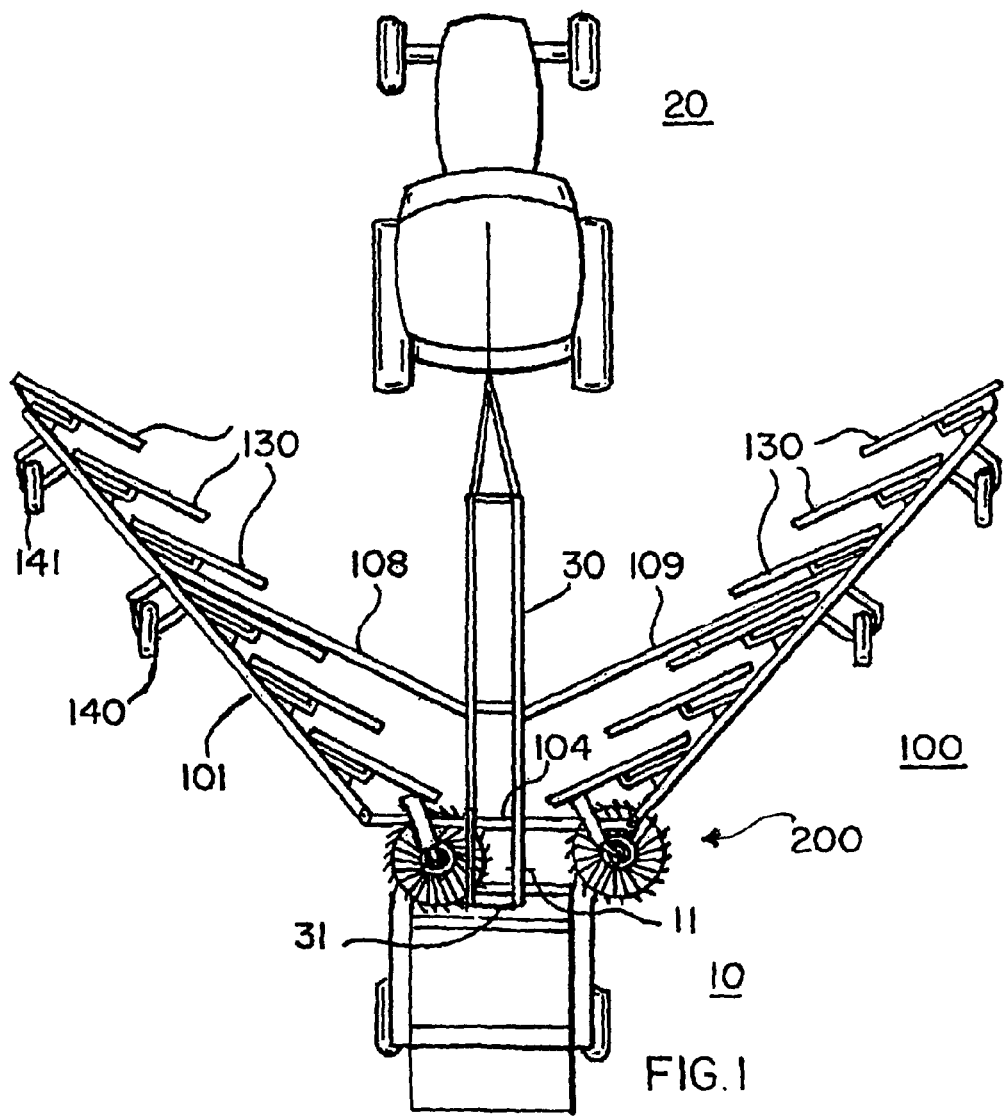
FIG. 1 is a top plan view of applicants tractor drawn rake and baler incorporating a windrow shifting mechanism proximate the in-feed to the baler and wherein the rake has articulated sweep arms.
Figure 2:
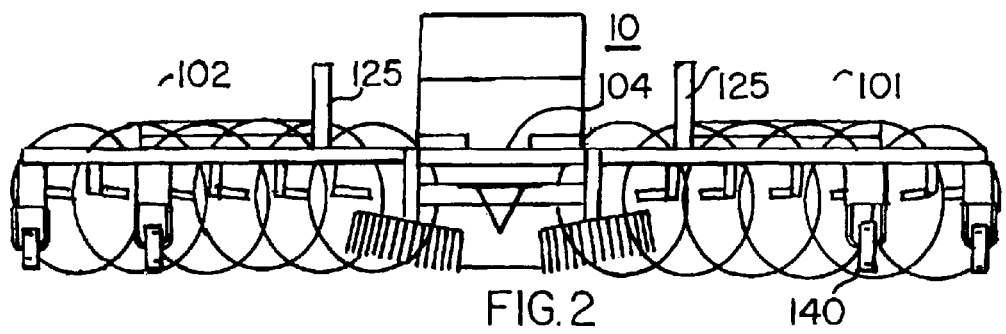
FIG. 2 is a front view of the rake and baler portion of applicants apparatus taken essentially along line 2-2 of FIG. 1.

FIG. 1 illustrates a roll type baler 10 towed by a tractor 20 via an elongate draw bar assembly 30. The draw bar maybe an assemblage or weldment of members suitably designed for the task taking into account strength and weigh considerations. The draw bar is connected to the baler as diagrammatically illustrated at 31 in FIGS. 1 and 12.

The baler 10 is conventional having a pick-up 11 that picks up a windrow on the ground and feeds it to a roll forming cavity located within the baler. Mounted on the draw bar is a wide sweep rake 100, provided in accordance with one aspect of the present invention, followed by a windrow crowder and diverter 200 provided in accordance with another aspect of the present invention.

The windrow crowder and diverter 200, described in detail hereinafter, shifts one or the other or both of the marginal edges of the windrow laterally relative to the intake of the baler during baling or can remain idle in instances where the width of the windrow corresponds in width to that of the baler pickup. Shifting the swath marginal edge portions makes the windrow narrower so as to correspond in width to the width of the baler pick-up and allows positioning the rake swing arms further apart from one another and thus sweep a wider area than otherwise would be possible.

The windrow crowder is controllably movable to make the windrow width up to for example 50% narrower than that of the baler pick-up and to divert that narrower windrow to different positions laterally across the width of the baler pick-up. This allows the operator to direct the material being picked up toward one edge or the other opposite edge of the bale or positions there between as, where or when needed to form a suitable bale.

The rake, mounted on the draw bar, sweeps an area of selected width (for example 27 feet—three 9 foot swath cuts) moving the cut material lying on the ground in that area into a windrow having a selected width that if desired can be wider or essentially equal in width with the baler pick-up and in alignment therewith. The crowder can be used to reduce the width of the windrow to match that of the baler pickup.

The rake 100 includes respective first and second articulated swing arms 101, 102 connected by respective ones of a pair of link members 103 to respective opposite ends of a cross bar 104 securely fixed to the draw bar 30 and located at a position forwardly of the pickup. Each link 103 is connected to the cross bar 104 by a pivot pin 105 having a vertical pivot axis and to the swing arm associated therewith by pivot pin 106 having a horizontal pivot axis. The pivotal connection provided by pin 105 allows the sweep arm to swing toward and away from the draw bar and pin 106 allows the arm to be swung upwardly to a rake storage or travel ready position.

The sweep arms 101, 102 diverge outwardly from one another in a direction generally toward the tractor and are located respectively on opposite sides of the draw bar 30. The free forward outer leading ends of the rake sweep arms are moveable via respective ones of a pair of power units 108, 109 in directions toward and away from the draw bar. Each power unit comprises an extendible and retractable hydraulic (or if desired pneumatic) cylinder unit (or equivalents thereof) connected at opposite ends thereof respectively to the draw bar 30 and the rake swing arm associated therewith.

Figure 3:
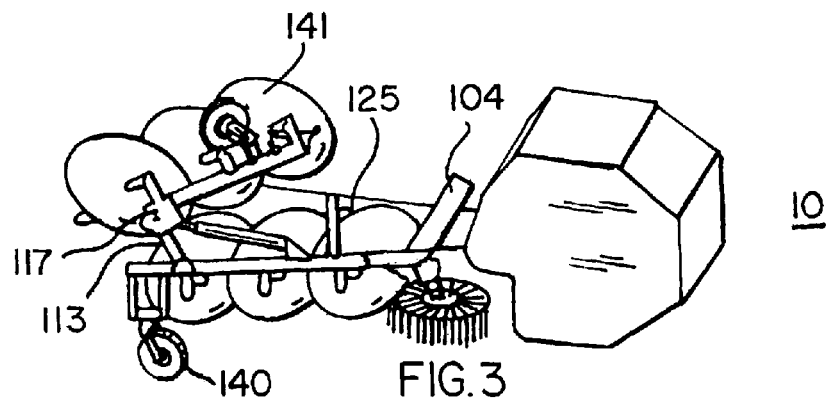
FIG. 3 is a diagrammatic oblique view illustrating one of the articulated rake arms in one position during folding of the same to an inoperative travel ready position
Figure 4:
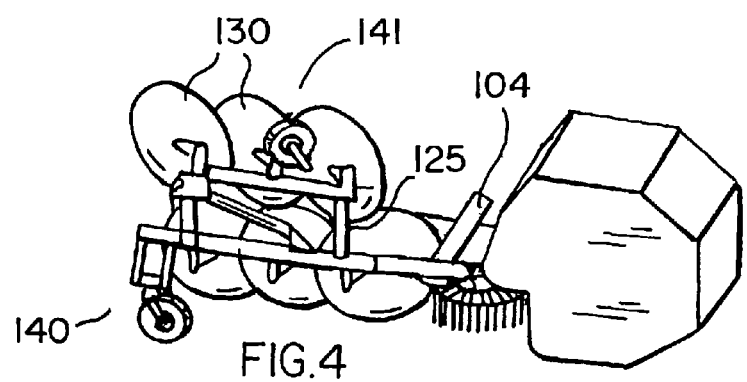
FIG. 4 is similar to FIG. 3 illustrating the same rake arm in a completely folded and retracted position assumed in a rake storage and travel ready position.
Figure 5:
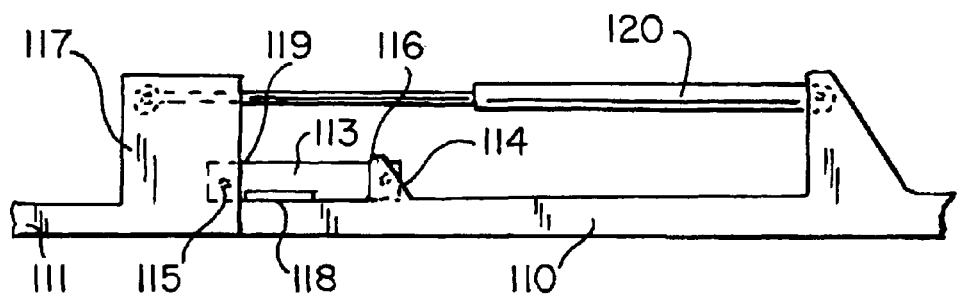
FIGS. 5, 6 and 7 are side elevational views of a portion of one of the pair of articulated rake arms illustrating various relative positions of the members of the arm with FIG. 5 showing them in a rake operating position (FIGS. 1 & 2), FIG. 7 showing them folded to a rake storage and travel ready position and FIG. 6 when the rake arm is midway between the two positions shown in FIGS. 5 and 7.
Figure 6:
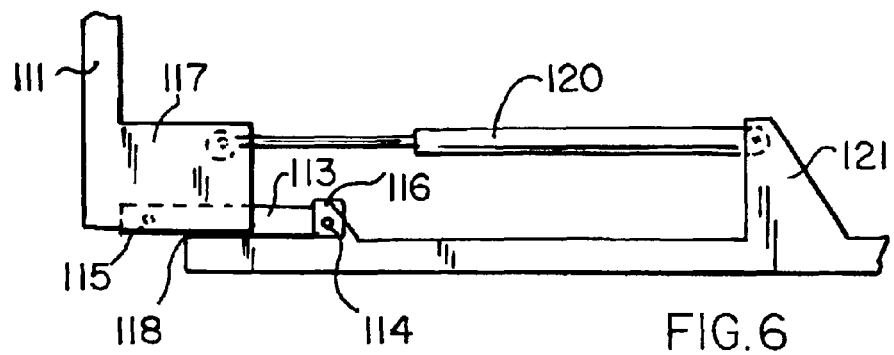
Figure 7:
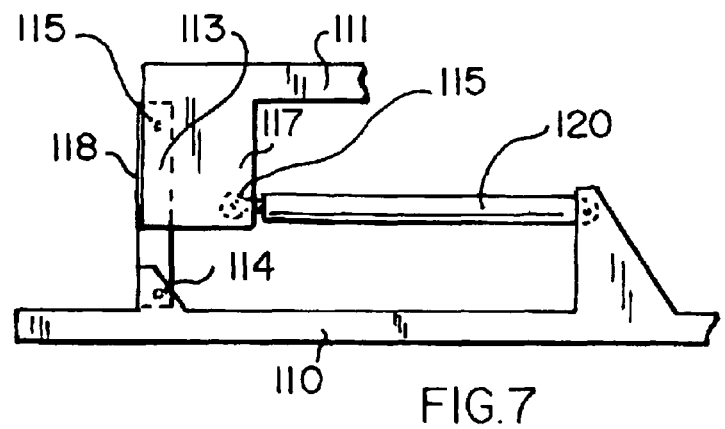

Each articulated arm 101, 102 comprises first and second rigid arm sections 110, 111 interconnected by hinge means 112. The hinge means 112 (see FIGS. 5-7) comprises a link 113 pivotally connected proximate respective opposite ends thereof via respective pivot pins 114, 115 to lugs 116, 117 secured to and projecting from respective arm sections 110, 111. The link 113 has an abutment plate 118 projecting laterally therefrom and located for engagement with an edge portion 119 of the lug 117 on the arm section 111. The arm sections 110, 111 as shown in FIG. 5 are disposed end-to-end in a rake operative position (FIG. 1) and are movable therefrom to the position shown in FIG. 7 where they are generally parallel to and offset from one another in a rake travel ready position (FIG. 4). FIG. 6 illustrates an intermediate position to that shown in FIGS. 5 and 7 where pivoting about pin 115 has brought the lug edge 119 into engagement with the abutment plate 118 by retraction of an extendable and retractable power unit 120 connected at opposite ends thereof to the lug 117 and a lug 121 on the respective arm sections 111, 110. In this position the rake arm section 111 projects vertically upward and further retraction of the power unit causes pivoting to occur about pivot pin 114 moving the link 113 from it's horizontal position (FIGS. 5, 6) to a vertical position (FIG. 7). The relative position of the rake arm sections shown in FIG. 6 is just prior to that shown in FIG. 3 that illustrates the rake arm being folded upon itself to a rake travel ready position. In this position the rake arm section 111 rests in a cradle on the upper end of a support post 125 secured to and projecting upwardly from the rake arm section 110.

Each rake arm section has a plurality of tined raking wheels 130 rotatably mounted thereon for rotation about generally horizontally disposed axes. Each rake arm is supported by a caster wheel units 140, 141 attached to and located under respective rake arm sections 110, 111. The unit 140 is located proximate the hinge means 112 interconnecting the arm sections 110, 111 and the other unit 141 is located proximate the free outer end of the arm section 111.

The windrow crowder and diverter 200 comprises a pair of tined units 201, 202 rotatably and swingably mounted by respective ones of a pair of assemblies 203 on the crossbar 104 associated therewith. Each tined unit rotates in a plane inclined at a selected acute angle to the horizontal and is caused to rotate by frictional engagement with the ground during the raking and baling operation, Each unit is a circular basket comprising a hub 205 with a plurality of spokes 206 extending outwardly therefrom and maintained in circumferential spaced apart relation by an annular rim 207 circumscribing and radially spaced from the hub. Each spoke has a first portion 208 that extends from the hub to the rim and a second portion 209 angularly disposed with respect to the first portion and projecting from the rim. The spoke portions 208 are located in a plane disposed generally perpendicular to the axis of rotation of the unit and the continuing second portions 209 define a generally cylindrical or truncated conical open wall whose axis coincides with the axis of rotation of the unit. The spokes pass through a respective one of a plurality of circumferentially spaced apart holes 210 in the rim 207 and are thereby held in spaced apart relation.

The hub 205 is detachably secured to a plate 212 on the end of a shaft 214 that is journalled for rotation proximate the lower end of a post 220 that is part of the aforementioned assembly 203. The assembly 203 has a further post 221 and a pair of an upper and lower spaced apart pair of links 222, 224 interconnecting the posts 220, 221. The links are pivotally connected to the posts by pivot pins 225, 226, 227, 228. Power unit 231 raises tine assembly 201 to a transport level or lowers it to a floating raking level. Tension springs 234 are suitably connected allowing the unit counterbalancing the same so as to float with a selected tined arc portion engaging the ground during raking.

The invention claimed is:

1. A hay baling assembly for cooperatively engaging a tractor providing towing and hydraulic power comprising:
   an elongated draw bar connecting a hay baler to said tractor in hydraulic communication therewith;
   said hay baler including a pick-up for feeding cut hay into a roll forming cavity located within said hay baler for baling;
   a sweep rake supported by said elongated draw bar, a crossbar positioned in front of said baler pick-up, said sweep rake including a first and a second articulated swing arm hingedly connecting to opposing ends of said crossbar supported by said elongated draw bar operable by at least one hydraulic cylinder connecting each one of said swing arms to said draw bar and in fluid communication with said hydraulic power of said tractor, said first and said second articulated swing arms diverging outwardly from a contracted transport position adjacent said elongated draw bar in an outwardly direction generally opposite from one another at a selected angle and distance in an extended position, each of said swing arms including a plurality of tined sweep raking wheels rotatably mounting on said swing arms at a selected acute angle to the ground surface, and each swing arm including at least one caster wheel unit for supporting said swing arm while in said extended position; and a windrow crowder and diverter including means for mounting on said elongated draw bar and behind said sweep rake and said tined sweep raking wheels and in front of said baler pick-up, said windrow crowder and diverter comprising at least one pair of tined diverter raking units rotatably and swingably mounting onto an assembly extending from said crossbar supported by said elongated draw bar, each one of said at least one pair of tined diverter raking units is positioned to rotate in a plane inclined at a selected acute angle to the horizontal causing said tined diverter raking units to rotate by frictional engagement with the ground during the raking and baling operation, each one of said tined diverter raking units comprise a hub with a plurality of spokes extending outwardly therefrom maintained in circumferential spaced apart relation by an annular rim circumscribing and radially spaced apart from said hub, each spoke including a portion extending from said hub angularly disposed and projecting from said annular rim, said spokes defining a generally cylindrical conical open wall whose axis coincide with the axis of rotation, said hub detachably attaching to a plate on an end of a shall journalled for rotation proximate the lower end of a first post extending from an upper and lower spaced apart pair of links pivotally attaching to a second post extending from said crossbar including diagonal link connecting said upper and lower links and at least one tension spring connecting to said tined diverter raking unit providing counterbalancing means for allowing said tined diverter raking unit to float at a raking level with a selected tined arc portion engaging the ground during raking, with each one of said tined diverter raking units including a hydraulic cylinder in fluid communication with said hydraulic power of said tractor, said hydraulic cylinder including a first end mounting to said crossbar and a second end connecting to said second post of said tined diverter raking units mounted and controllably movable for shifting a marginal edge of a windrow of hay laterally to a selected position with respect to said baler pick-up diverting said narrower windrow to a selected different position laterally across the width of said baler pick-up as needed for providing a sufficient amount of hay for forming a suitable bale.

2. The hay baling assembly of claim 1, wherein said windrow crowder and diverter adjust a windrow width up to 50% narrower than said baler pick-up width.

3. The hay baling assembly of claim 1, including power unit means for raising said tined diverter raking units to a transport level and lowering said tined diverter raking units to a floating raking level.

4. The hay baling assembly of claim 1 wherein said first and said second articulated swing arms are longer in an extended position than said draw bar.

5. The hay baling assembly of claim 1, wherein each one of said first and said second articulated swing arm comprises a first rigid arm section and a second rigid arm section connected by hinge means whereby each said articulated swing arm is capable of bending to conform to uneven ground during use as a rake.

6. The hay baling assembly of claim 5, wherein said hinge means connecting said first rigid arm section and said second rigid arm section comprises at least one hydraulic cylinder capable of folding said second rigid arm section parallel to and offset to said first rigid arm section for the purpose of transport and of unfolding of said second rigid arm section outwardly away from said first rigid arm section to an in-line and in use position.

7. The hay baling assembly of claim 1, including power unit means for raising and lowering said first and a second articulated swing arm and said tined sweep raking wheels to a transport level and lowering said tined sweep raking wheels to a floating raking level.

8. The hay baling assembly of claim 1 wherein each one of said tined diverter raking units comprise a basket.

9. A hay baling assembly, consisting of:
a hay baler including a baler pick-up for feeding cut hay into a roll forming cavity located within said hay baler for baling; and a windrow crowder and diverter including means for mounting on an elongated draw bar behind a sweep rake including a plurality of sweep raking wheels and in front of said baler pick-up, said windrow crowder and diverter comprising at least one pair of tined diverter raking units rotatably and swingably mounting onto an assembly extending from a crossbar supported by said elongated draw bar, each one of said at least one pair of tined diverter raking units is positioned to rotate in a plane inclined at a selected acute angle to the horizontal causing said tined diverter raking units to rotate by frictional engagement with the ground during the raking and baling operation, each one of said tined diverter raking units comprise a hub with a plurality of spokes extending outwardly therefrom maintained in circumferential spaced apart relation by an annular rim circumscribing and radially spaced apart from said hub, each spoke including a portion extending from said hub angularly disposed and projecting from said annular rim, said spokes defining a generally cylindrical conical open wall whose axis coincide with the axis of rotation, said hub detachably attaching to a plate on an end of a shaft journalled for rotation proximate the lower end of a first post extending from an upper and lower spaced apart pair of links pivotally attaching to a second post extending from said crossbar including diagonal link connecting said upper and lower links and at least one tension spring connecting to each one of said tined diverter raking units providing counterbalancing means for allowing said tined diverter raking units to float at a raking level with a selected tined arc portion engaging the ground during raking, with each one of said tined diverter raking units including a hydraulic cylinder in fluid communication with said hydraulic power of said tractor, said hydraulic cylinder including a first end mounting to said crossbar and a second end connecting to said second post of said tined diverter raking units mounted and controllably movable for shifting, a marginal edge of a windrow of hay laterally to a selected position with respect to said baler pick-up diverting said narrower windrow to a selected different position laterally across the width of said baler pick-up as needed for providing a sufficient amount of hay for forming a suitable bale.

10. The hay baling assembly of claim 9, wherein said tined diverter raking units rotate in a plane inclined at a selected acute angle to the horizontal and is caused to rotate by frictional engagement with the ground.

11. The hay baling assembly of claim 9, including power unit means for raising said tined diverter raking units to a transport level and lowering said tined raking units to a floating raking level.

12. A hay baling assembly for cooperatively engaging a tractor providing towing and hydraulic power consisting essentially of:

an elongated draw bar connecting a hay baler to said tractor in hydraulic communication therewith;

said hay baler including a pick-up for feeding cut hay into a roll forming cavity located within said hay baler for baling;

a sweep rake supported by said elongated draw bar, a crossbar positioned in front of said baler pick-up, said sweep rake including a first and a second articulated swing arm hingedly connecting to opposing ends of said crossbar supported by said elongated draw bar operable by at least one hydraulic cylinder connecting each one of said swing arms to said draw bar and in fluid communication with said hydraulic power of said tractor, said first and said second articulated swing arms diverging outwardly from a contracted transport position adjacent said elongated draw bar in an outwardly direction generally opposite from one another at a selected angle and distance in an extended position, each of said swing arms including a plurality of tined sweep raking wheels rotatably mounting on said swine arms at a selected acute angle to the ground surface, and each swing arm including at least one caster wheel unit for supporting said swine arm while in said extended position; and a windrow crowder and diverter including means for mounting on said elongated draw bar and behind said sweep rake and said sweep raking wheels and in front of said baler pick-up, said windrow crowder and diverter comprising at least one pair of tined diverter raking units rotatably and swingably mounting onto an assembly extending from said crossbar supported by said elongated draw bar, each one of said at least one pair of tined diverter raking units is positioned to rotate in a plane inclined at a selected acute angle to the horizontal causing said tined diverter raking unit to rotate by frictional eneagement with the ground during the raking and baling operation, each tined diverter raking unit defines a basket which comprises a hub including a first portion including a plurality of spokes extending outwardly therefrom maintained in circumferential spaced apart relation by an annular rim circumscribing and radially spaced apart from said hub, and each of said plurality of said spokes extend from said hub to said rim of each spoke including a portion extending from said hub angularly disposed and projecting from said annular rim, said basket type tined raking reel including a second portion angularly disposed with respect to said first portion and projecting from said rim with said second portion located in a plane disposed generally perpendicular to the axis of rotation defining a generally perpendicular to the axis of rotation defining a generally cylindrical or truncated conical open wall whose axis coincides with the axis of rotation with said spokes passing through a respective one of a plurality of circumferentially spaced apart holes disposed in said rim and held in spaced apart relation, said hub detachably attaching to a plate on an end of a shaft journalled for rotation proximate the lower end of a first post extending from an upper and lower spaced apart pair of links pivotally attaching to a second post extending from said crossbar including diagonal link connecting said upper and lower links and at least one tension spring connecting to said tined diverter raking unit providing counterbalancing means for allowing said tined diverter raking unit to float at a raking level with a selected tined arc portion engaging the ground during raking, with each one of said tined diverter raking units including a hydraulic cylinder in fluid communication with said hydraulic power of said tractor, said hydraulic cylinder including a first end mounting to said crossbar and a second end connecting to said second post of said tined diverter raking unit mounted and controllably movable for shifting a marginal edge of a windrow of hay laterally to a selected position with respect to said baler pick-up diverting said narrower windrow to a selected different position laterally across the width of said baler pick-up as needed for providing a sufficient amount of hay for forming a suitable bale.

13. The hay baling assembly of claim 12, wherein said windrow crowder and diverter adjust a windrow width up to 50% narrower than said baler pick-up width.

14. The hay baling assembly of claim 12, including power unit means for raising said tined diverter raking units to a transport level and lowering said tined diverter raking units to a floating raking level.

15. The hay baling assembly of claim 12 wherein said first and said second articulated swing arms are longer in an extended position than said draw bar.

16. The hay baling assembly of claim 12, wherein each one of said first and said second articulated swing arm comprises a first rigid arm section and a second rigid arm section connected by hinge means whereby each said articulated swing arm is capable of bending to conform to uneven ground during use as a rake.

17. The hay baling assembly of claim 16, wherein said hinge means connecting said first rigid arm section and said second rigid arm section comprises at least one hydraulic cylinder capable of folding said second rigid arm section parallel to and offset to said first rigid arm section for the purpose of transport and of unfolding of said second rigid arm section outwardly away from said first rigid arm section to an in-line and in use position.

18. The hay baling assembly of claim 12, including power unit means for raising and lowering said first and a second articulated swing arm and said tined sweep raking wheels to a transport level and lowering said tined sweep raking wheels to a floating raking level.

\* \* \* \* \*